(12) United States Patent
Teboulle et al.

(10) Patent No.: US 11,490,359 B2
(45) Date of Patent: Nov. 1, 2022

(54) GROUP ACKNOWLEDGEMENT IN A WIRELESS COMMUNICATION NETWORK

(71) Applicant: SAGEMCOM ENERGY & TELECOM SAS, Rueil Malmaison (FR)

(72) Inventors: Henri Teboulle, Rueil Malmaison (FR); Marc Le Gourrierec, Rueil Malmaison (FR); Guillaume Lecocq, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 9 days.

(21) Appl. No.: 16/506,549

(22) Filed: Jul. 9, 2019

(65) Prior Publication Data

US 2020/0022111 A1    Jan. 16, 2020

(30) Foreign Application Priority Data

Jul. 13, 2018  (FR) ........................................ 1856503
Oct. 3, 2018   (FR) ........................................ 1859176

(51) Int. Cl.
*H04W 72/00*  (2009.01)
*H04L 12/18*  (2006.01)
(Continued)

(52) U.S. Cl.
CPC ......... *H04W 72/005* (2013.01); *H04L 12/185* (2013.01); *H04L 12/1868* (2013.01); *H04W 4/08* (2013.01); *H04W 72/082* (2013.01)

(58) Field of Classification Search
CPC ... H04W 72/005; H04W 4/08; H04W 72/082; H04W 4/70; H04W 4/06; H04L 12/185;
(Continued)

(56) References Cited

U.S. PATENT DOCUMENTS

2003/0214928 A1*  11/2003  Chuah .................... H04L 47/30
                                                          370/336
2004/0002336 A1    1/2004   Wu et al.
(Continued)

OTHER PUBLICATIONS

Aug. 9, 2019 Search Report issued in French Patent Application No. 1859176.

*Primary Examiner* — Peter P Chau
(74) *Attorney, Agent, or Firm* — Oliff PLC (57) ABSTRACT

A system includes a server, a plurality of end devices, and at least one gathering gateway serving as a relay between the server and the end devices. The server creates at least one group and allocates end devices to each group created; defines, for each group, instances of a group reception window separated by a period so as to occur at deterministic instants; receives uplink frames coming from end devices; for such end device allocated to a group, acknowledges the uplink frames received in a downlink frame transmitted in multicast mode, in such group reception window defined for said group, said downlink frame including a group acknowledgement for all the uplink frames sent by end devices of the group during the period preceding said instance of the group reception window; and, for such end device that is not allocated to a group, acknowledges the uplink frames received in unicast mode.

20 Claims, 5 Drawing Sheets

(51) Int. Cl.
*H04W 4/08* (2009.01)
*H04W 72/08* (2009.01)

(58) Field of Classification Search
CPC ......... H04L 12/1868; H04L 2001/0097; H04L 2001/0096; H04L 12/1881; H04L 1/16
See application file for complete search history.

(56) References Cited

U.S. PATENT DOCUMENTS

| | | |
|---|---|---|
| 2013/0077555 A1 | 3/2013 | Gao et al. |
| 2017/0155490 A1* | 6/2017 | Wang .................... H04L 1/1671 |
| 2018/0054250 A1 | 2/2018 | Zhang et al. |

* cited by examiner

GROUP ACKNOWLEDGEMENT IN A WIRELESS COMMUNICATION NETWORK

The present invention relates to a transmission of acknowledgements of uplink frames in a communication system in which predetermined reception windows are used to transmit downlink frames acknowledging the uplink frames in question.

The Internet of Things is emerging. The Internet of Things represents the extension of the internet to things and places in the physical world. Whereas the internet does not normally extend beyond the electronic world, the Internet of Things represents exchanges of information and data coming from devices present in the real world to the internet, such as for example to collect electricity-consumption or water-consumption readings. The Internet of Things is considered to be the third evolution of the internet, referred to as Web 3.0. The Internet of Things is partly responsible for the current increase in the volume of data to be transmitted and stored, and thus gives rise to what is referred to as "Big Data". The Internet of Things has a universal character for designating putting objects in communication for various uses, for example in the industrial, food, e-health or home-automation fields.

To enable communicating objects, also referred to as end devices, to communicate in the context of the Internet of Things, gathering gateways situated on geographically high points are deployed by an operator. Apart from maintenance operations, these gathering gateways are typically fixed and permanent. Mention can be made for example, with regard to this model, of SigFox (registered trade mark) or ThingPark (registered trade mark) networks. These gathering gateways communicate with the communicating objects by means of medium- or long-range radio communications, such as for example the LoRaWAN (Long Range Wide-Area Network) technology, also known by the abbreviation LoRa (Long Range) from the name of the alliance promoting LoRaWAN technology. These gathering gateways thus serve as a relay between the communicating objects and a server (core network) configured to process information transferred by the end devices and to send messages (e.g. instructions) to said end devices.

In order to be able to go on standby as much as possible, the end devices, in their indirect communications with the server (via one or more gathering gateways), apply a communication mechanism referred to as Class A in the LoRaWAN data transmission protocol. This mechanism consists of defining, deterministically for an end device in question and the gathering gateway that acts as a relay for a server, one or more reception windows during which the end device in question listens on the communication medium (two reception windows in the case of the LoRaWAN data transmission protocol) where the downlink communications must be made. One or more reception windows begin at the end of a period of predefined duration according to an uplink communication initiated by the end device in question and also have a predefined duration. A downlink frame that must be addressed to said end device is then effected in one or other (where applicable) of said plurality of reception windows, in particular to acknowledge said uplink frame. It is in fact typically necessary for the end device in question to know that the server has actually received the data of the uplink frame transmitted by said end device. This approach by reception windows beginning at predetermined instants and deterministically for the end device in question and the gathering gateway that acts as a relay for said server enables said end device to go on standby meantime and thus to preserve its built-in energy supply.

However, from the point of view of the management of transmissions of downlink frames, this approach offers few opportunities for transmitting data to said end device, unless the number of reception windows is increased or the duration thereof is increased. In addition, this drawback is reinforced by the fact that some of these reception windows serve to formally acknowledge the uplink frame that triggers the definition of said reception windows. This is because, while the gathering gateway in question acknowledges the uplink frame in question in this way, the communication medium on which the communications between the end devices and the gathering gateways rely is not completely free for making other communications. In other words, either this prevents other communications, or this causes interference with regard to other communications.

It is desirable to overcome these drawbacks of the prior art, which can be found more generally in wireless communication networks functioning on such reception windows, such as for example in LPWAN (Low-Power Wide Area Network) communication systems.

The invention relates to a method for transmitting acknowledgements in a communication system comprising a server, a plurality of end devices, and at least one gathering gateway serving as a relay between the server and the end devices, each end device communicating with at least one said gathering gateway via a wireless communication medium, the method being implemented by the server. The method comprises the following steps: creating at least one group and allocating end devices to each group created; defining, for each group created, instances of a group reception window separated by a period P, so that the instances of group reception windows occur at deterministic instants; receiving uplink frames coming from the end devices; for a said end device allocated to a group, acknowledging the uplink frames received in a downlink frame transmitted in multicast mode in a said instance of the group reception window defined for said group, said downlink frame including a group acknowledgement for all the uplink frames sent by end devices in the group during the period P preceding said instance of the group reception window; and, for a said end device that is not allocated to a group, acknowledging the uplink frames received in unicast mode. Thus the bandwidth consumption of the communication system is more effective by virtue of the grouped acknowledgement.

According to a particular embodiment, in allocating a said end device to a group, the server transmits to said end device a subscription message by means of which the server indicates to said end device that said end device has been associated with said group, the subscription message including index information indicating with which index said end device is associated in said group, the index associating with said end device a bit position in a field of the group acknowledgements.

According to a particular embodiment, the server transmits to said end device a subscription message by means of which the server indicates to said end device that said end device has been associated with said group, and an index is implicitly associated with said end device in said group, the index associating with said end device a bit position in a field of the group acknowledgements, the index having a value equal to the value of $Ng\_b > 0$ least significant bits among $Nd$ bits used for representing an address attributed to said end device for communicating in the communication system.

According to one particular embodiment, the subscription message includes a time reference field representing an instant at which, for said group, the next instance of the group reception window starts.

According to one particular embodiment, the time reference field further includes supplementary information representing a duration of the period P separating the group reception window instances for said group.

According to one particular embodiment, the time reference field further includes information on variability of the period P separating the group reception window instances for said group.

According to one particular embodiment, the duration of the period P is variable according to a predefined sequence of durations, and the time reference field includes information indicating where the group is in said predefined sequence of durations, the predefined sequence of durations then being known in advance to the end devices or included in the subscription message.

According to one particular embodiment, the group acknowledgement includes a time synchronisation field supplying a relative time corresponding to the instant at which the next instance of the group reception window occurs for said group.

The invention also relates to a server configured to implement this first method presented above in any of the embodiments thereof.

The invention also relates to a method for receiving acknowledgements in a communication system comprising a server, a plurality of end devices, and at least one gathering gateway serving as a relay between the server and the end devices, each end device communicating with at least one said gathering gateway via a wireless communication medium, the method being implemented by each end device. The method comprises the following steps: transmitting uplink frames to the server; when said end device has received from the server a message allocating the end device to a group, programming a listening on the wireless communication medium during instances of a group reception window separated by a period P, so that the group reception window instances occur at deterministic instants; when said end device is allocated to a group, receiving in multicast mode downlink frames including acknowledgements of said uplink frames during the instances of the group reception window, each downlink frame including a group acknowledgement for all the uplink frames sent by end devices in the group during a period P preceding said instance of the group reception window; and, when said end device is not allocated to a group, receiving in unicast mode downlink frames including acknowledgements of said uplink frames.

According to a particular embodiment, the method comprises the following steps: receiving from the server a subscription message by means of which the server indicates to said end device that said end device has been associated with said group, the subscription message including index information indicating with which index said end device is associated in said group, the index associating with said end device a bit position in a field of the group acknowledgements; and, on reception of a group acknowledgement, determining whether the uplink frame previously transmitted by said end device is acknowledged, by checking the value at said bit position in the field of the group acknowledgements.

According to a particular embodiment, the method comprises the following step: receiving from the server a subscription message by means of which the server indicates to said end device that said end device has been associated with said group. In addition, an index is implicitly associated with said end device in said group, the index associating with said end device a bit position in a field of the group acknowledgements, the index having a value equal to the value of $Ng\_b > 0$ least significant bits among Nd bits used for representing an address attributed to said end device for communicating in the communication system. And the method further comprises the following step: on reception of a group acknowledgement, determining whether the uplink frame previously transmitted by said end device is acknowledged, checking the value at said bit position in the field of the group acknowledgements.

According to a particular embodiment, the subscription message includes a time reference field representing an instant at which, for said group, the next instance of the group reception window starts, and said end device programs a listening on the wireless communication medium according to the time reference field.

According to a particular embodiment, the time reference field further includes supplementary information representing a duration of the period P separating the group reception window instances for said group.

According to a particular embodiment, the time reference field further includes information on variability of the period P separating the group reception window instances for said group.

According to a particular embodiment, the duration of the period P is variable according to a predefined sequence of durations, the time reference field further indicates where the group is in said predefined sequence of durations, the predefined sequence of durations then being known in advance to the end device or included in the subscription message.

According to a particular embodiment, the group acknowledgement includes a time synchronisation field supplying a relative time corresponding to the instant at which the next instance of the group reception window occurs for said group, and the method further comprises the following steps: programming a listening on the wireless communication medium during a group reception window instance for said group, independently of any uplink transmission by said end device; and resynchronising the internal clock of said end device by means of a determination of an offset between an actual transmission or reception instant of a group acknowledgement received during the group reception window instance thus programmed and a previously estimated instant of transmission or reception of said group acknowledgement.

The invention also relates to an end device configured to implement this second method presented above in any of the embodiments thereof.

The features of the invention mentioned above, as well as others, will emerge more clearly from a reading of the following description of an example embodiment, said description being given in relation to the accompanying drawings, among which.

Figure 1:
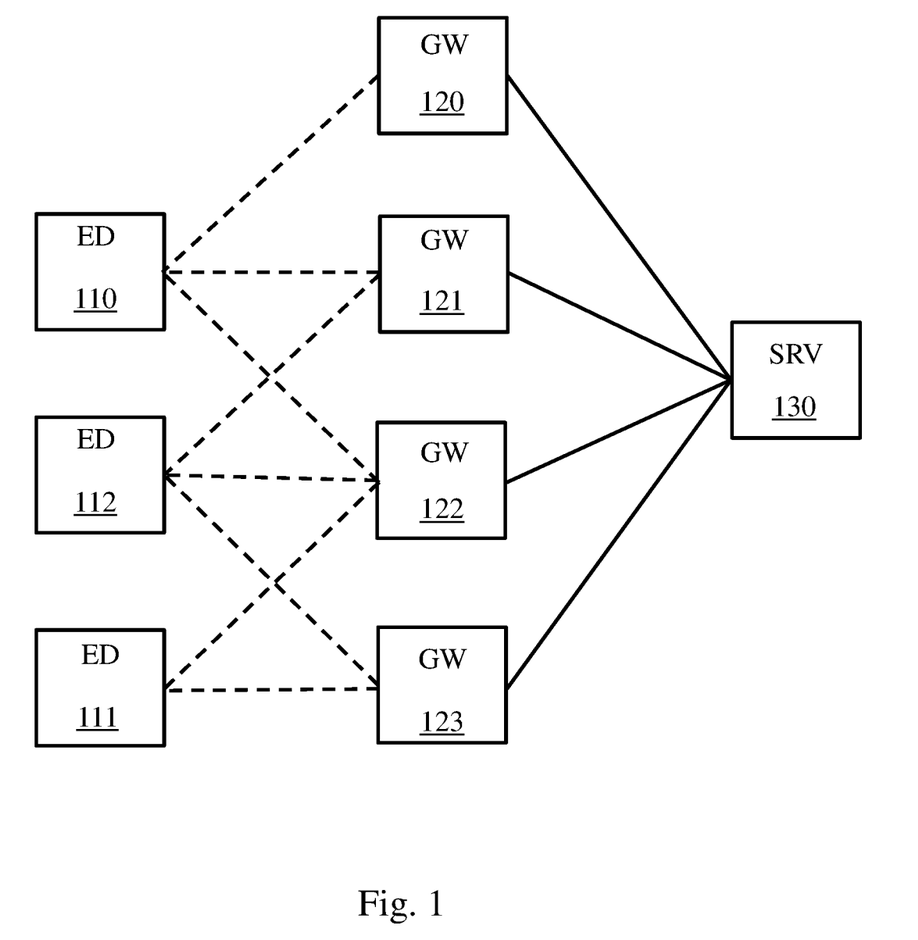
FIG. 1 illustrates schematically a communication system in which the present invention can be implemented.

The communication system comprises at least one gathering gateway 120, 121, 122, 123 (denoted GW, standing for GateWay, in the Figs.). The gathering gateways 120, 121, 122, 123 have available respective communication links with a server 130 (denoted SRV in the Figs.), to which said gathering gateways 120, 121, 122, 123 are attached. For example, the server 130 is of the LNS (LoRaWAN Network Server) type. Four gathering gateways are shown in FIG. 1, but the communication system may comprise a different number of gathering gateways.

In the communication system, messages must be transferred in the form of frames from a set of end devices 110, 111, 112 (denoted ED, standing for End Device, in the Figs.) to the server 130. Three end devices are shown in FIG. 1, but the communication system may comprise a different number of end devices.

The server 130 has a role of monitoring and collecting information available from the end devices 110, 111, 112, and the gathering gateways 120, 121, 122, 123 have a role of relay between the end devices 110, 111, 112 and the server 130. Messages, in particular acknowledgement messages, may also be transmitted in the form of frames from the server 130 to the end devices 110, 111, 112 via the gathering gateways 120, 121, 122, 123.

To make it possible to fulfil this role of relay, each gathering gateway 120, 121, 122, 123 has a least one radio interface enabling said gathering gateway to communicate with at least one end device 110, 111, 112 by relying on a wireless communication system, and preferentially according to an LPWAN communication technology. Said radio interface is for example of the LoRa type, thus making it possible to implement, in the communication system, a LoRaWAN data transmission protocol. Said radio interface is such that an end device may be within radio communication range of a plurality of gathering gateways, depending on the geographical position of said end device with respect to the gathering gateways 120, 121, 122, 123 and the radio transmission conditions in the environment of said end device and the gathering gateways 120, 121, 122, 123. This is the case for example with the end device 110 in FIG. 1, which is within radio communication range of the gathering gateways 120, 121 and 122 (represented by broken lines in FIG. 1). In addition, each gathering gateway 120, 121, 122, 123 has at least one other interface enabling said gathering gateway to communicate with the server 130. For example, this other interface is a cabled interface for communicating with the server 130 via the internet.

An example of protocol architecture implemented in the communication system so as thus to enable the end devices 110, 111, 112 and the server 130 to communicate via the gathering gateways 120, 121, 122, 123 is described below in relation to FIG. 3.

Figure 2:
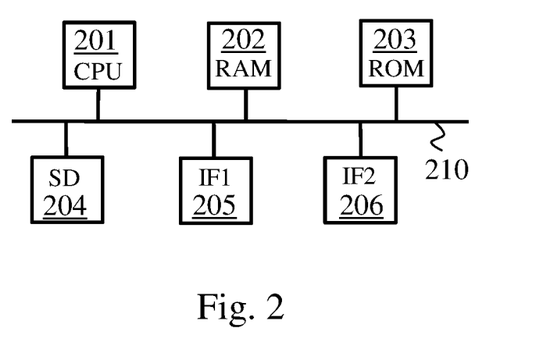
FIG. 2 illustrates schematically an example of hardware architecture of a communication device in the communication system in FIG. 1.

FIG. 2 illustrates schematically an example of hardware architecture of a communication device of the communication system in FIG. 1. Each end device 110, 111, 112 and/or each gathering gateway 120, 121, 122, 123 and/or the server 130 may be constructed on the basis of such hardware architecture.

The communication device comprises, connected by a communication bus 210: a processor or CPU (central processing unit) 201; a random access memory RAM 202; a read only memory ROM 203; a storage unit or a storage medium reader, such as an SD (Secure Digital) card reader 204 or a hard disk drive HDD; a communication interface IF1 205, and optionally another communication interface IF2 206.

When the communication device in FIG. 2 represents an end device of the communication system, the communication interface IF1 205 is configured to enable said end device to communicate with gathering gateways of the communication system.

When the communication device in FIG. 2 represents a gathering gateway 120, 121, 122, 123 of the communication system, the communication interface IF1 205 is configured to enable said gathering gateway to communicate with end devices of the communication system, and the other communication interface IF2 206 is configured to enable said gathering gateway to communicate with the server 130.

When the communication device in FIG. 2 represents the server 130, the communication interface IF1 205 is configured to enable said server 130 to communicate with the gathering gateways 120, 121, 122, 123, in a way that is compatible with the communication interface IF2 206 of the gathering gateways 120, 121, 122, 123.

The processor 201 is capable of executing instructions loaded into the RAM memory 202 from the ROM memory 203, from an external memory, from a storage medium, or from a communication network. When the communication device in question is powered up, the processor 201 is capable of reading instructions from the RAM memory 202 and executing them. These instructions form a computer program causing the implementation, by the processor 201, of all or some of the algorithms and steps described here in relation to the communication device in question.

Thus all or some of the algorithms and steps described here can be implemented in software form by the execution of a set of instructions by a programmable machine, such as a DSP (digital signal processor) or a microcontroller. All or some of the algorithms and steps described here can also be implemented in hardware form by a machine or a dedicated component, such as an FPGA (field-programmable gate array) or an ASIC (application-specific integrated circuit). In general terms, the communication device in question comprises electronic circuitry suitable and configured for implementing the algorithms and steps described here in relation to the communication device in question.

Figure 3:
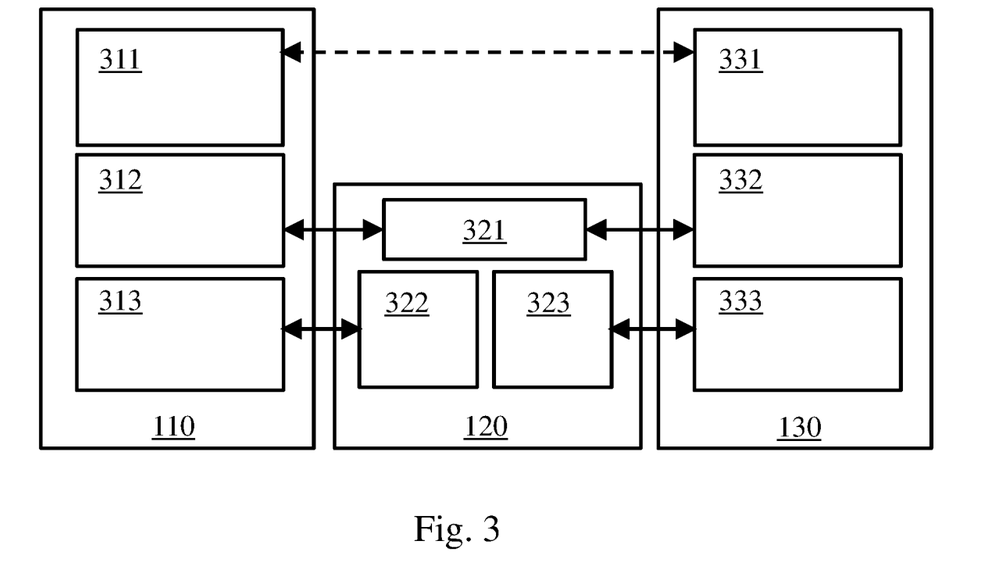
FIG. 3 illustrates schematically an example of protocol architecture implemented in the communication system in FIG. 1.

FIG. 3 illustrates schematically an example of protocol architecture implemented in the communication system in FIG. 1. FIG. 3 illustrates the protocol architecture distributed between the end device 110, the gathering gateway 120 and the server 130.

The end device 110 comprises a top layer 311 and a bottom layer 313, as well as an intermediate layer 312 forming the link between the top layer 311 and the bottom layer 313. The top layer 311 is a client application. The end device 110 may thus comprise a plurality of client applications. The intermediate layer 312 implements the exchange protocol, for example of the LoRaWAN type, between the end device 110 and the server 130 via the gathering gateway 120. The bottom layer 313 is the physical layer (PHY) of the radio interface of the end device 110, for example of the LoRa type, which enables said end device 110 to communicate with the gathering gateways of the communication system, such as for example the gathering gateway 120.

The server 130 comprises a top layer 331 and a bottom layer 333, as well as an intermediate layer 332 forming the link between the top layer 331 and the bottom layer 333. The top layer 331 is a server application. The server 130 may thus comprise a plurality of server applications. It should be noted that the representation in FIG. 3 is a logic representation, and that the server application may be executed on distinct respective items of equipment of the server 130, or that the server 130 may be seen as a set consisting of a plurality of interconnected machines collaboratively implementing the functionalities described here.

The intermediate layer 332 implements the exchange protocol, for example of the HTTPS (HyperText Transfer Protocol Secure) type between the server 130 and the gathering gateways 120, 121, 122, 123. The bottom layer 333 is the physical layer (PHY) of the interface of the server 130 that makes it possible to communicate with the gathering gateways 120, 121, 122, 123.

The gathering gateway 120 comprises a first bottom layer 322 and a second bottom layer 323, as well as an adaptation module 321. The first bottom layer 322 is the physical layer (PHY) of the radio interface of the gathering gateway 120 that makes it possible to communicate with end devices of the communication system, such as for example the end device 110. The second bottom layer 323 is the physical layer (PHY) of the interface of the gathering gateway 120 that makes it possible to communicate with the server 130. The adaptation module 321 is configured to convert the messages received via the first bottom layer 322 into messages suited to the second bottom layer 323, and vice versa. During this conversion, the gathering gateway 120 may enhance said message with supplementary information, such as for example a received signal strength indication RSSI determined by said gathering gateway 120 on reception of said message.

The protocol architecture depicted in FIG. 3 is such that the intermediate layer 312 of the end device 110 communicates with the intermediate layer 321 of the gathering gateway 120 by relying on the respective bottom layers of the end device 110 and of the gathering gateway 120. The protocol architecture depicted in FIG. 3 is also such that the top layer 311 of the end device 110 communicates with the top layer 331 of the server 130, relying on the respective intermediate layers 312, 321, 332 of the end device 110, of the gathering gateway 120 and of the server 130. The same server application can thus communicate with respective client applications executed on as many end devices, and the same end device executing a plurality of client applications can thus communicate with as many server applications executed on the server 130.

The protocol layers and modules depicted may be supplemented in particular by protocol stacks enabling the server 130 to exchange with the gathering gateway 120, in particular to enable the server 130 to configure the gathering gateway 120.

By means of the creation of at least one group and the allocation of a plurality of end devices to said group, the server 130 is able to acknowledge, in the same downlink frame, a plurality of uplink frames respectively transmitted by distinct end devices, or by distinct client applications (whether or not they are within the same end device). By virtue of the definition of the group and of an associated group reception window, the server 130 makes a rendezvous with the end devices of the group at predetermined instants at which said end devices can listen on the communication medium (between said end devices and the gathering gateways) in order to determine whether their uplink frame is acknowledged in a group acknowledgement transmitted at this moment by a gathering gateway on behalf of the server 130.

Figure 4:
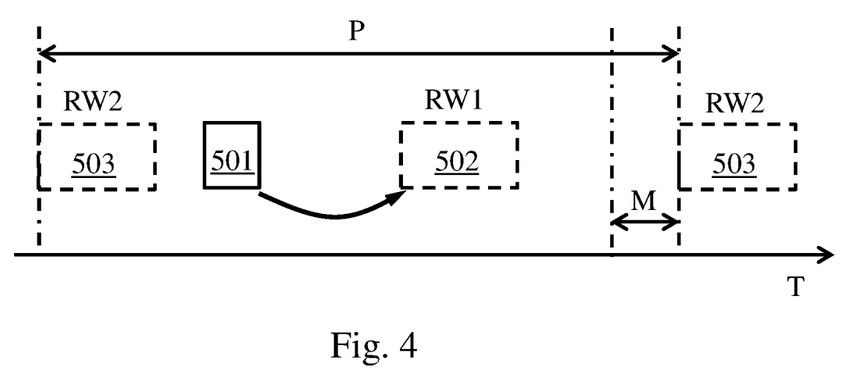
FIG. 4 illustrates schematically arrangements of reception windows, in a particular embodiment of the invention.

FIG. 4 illustrates schematically arrangements of reception windows, in a particular embodiment of the invention. We shall consider by way of illustration that the end device 110 transmits an uplink frame 501 that is relayed by one or more gathering gateways to the server 130. We shall also consider that the end device 110 (or at least a client application of the end device 110) belongs to a group for which a reception window RW2 503, referred to as a group reception window, is defined at predetermined instants. The occurrence of the instances of the reception window RW2 503 takes place at instants that are deterministic for the server 130, as well as for the end devices belonging to the group in question. FIG. 4 shows two successive instances of the group reception window RW2 503, separated by a period P of time T.

Preferentially, the instances of the reception window RW2 503 occur at substantially regular instants (substantially fixed duration of the period P). In a particular embodiment, the instances of the reception window RW2 503 occur at regular instants (fixed duration of the period P).

Because of the transmission of the uplink frame 501, an instance of a reception window RW1 502, referred to as an individual reception window, begins at the end of a period of predefined duration after the transmission of the uplink frame 501. A plurality of instances of the reception window RW1 502 may thus be created in a predefined fashion.

The individual reception window RW1 502 is intended to enable the server 130 to make downlink communications in unicast mode, by means of a gathering gateway selected by the server 130, to the end device 110. This is the same communication mechanism referred to as Class A in the LoRaWAN data transmission protocol, except that, when the end device 110 belongs to a group, the acknowledgement of the uplink 501 is done in the following group reception window RW2 503 rather than in the individual reception window RW1 502. This is because, since the server 130 does not necessarily have any information or commands to transmit specifically to the end device 110 at this moment, effecting a downlink transmission in an instance of the individual reception window RW1 502 in order simply to acknowledge the uplink frame 501 would cause an unnecessary overhead of the bandwidth. Group acknowledgement is then spoken of. This aspect is detailed hereinafter in relation to FIG. 6. If however the sever 130 has information or commands to transmit specifically to the end device 110 at this moment, the server 130 can make a downlink transmission in an instance of the individual reception window RW1 502 and acknowledge said uplink frame in the downlink frame in addition to said information or commands. The behaviour that is for example referred to as piggyback in the LoRaWAN protocol is found here.

It is considered that the end device 110 refrains from transmitting more than one uplink frame corresponding to a given group to which said end device 110 belongs, between two instances of the group reception window RW2 503 associated with said group. The rate of instances of the group reception window RW2 503 is therefore defined so as to comply with the application requirements between the end devices 110, 111, 112 and the server 130.

In a particular embodiment, the end device 110 refrains from transmitting uplink frames during certain time subperiods of the period P. For example, the end device 110 refrains from transmitting uplink frames during a marginal period M that precedes (and juxtaposes) the instant of start of an instance of the group reception window RW2 503, as shown in FIG. 3. This avoids creating uncertainty as to the instance of the group reception window RW2 503 where the acknowledgement of the uplink frame in question is supposed to be situated.

In a particular embodiment, the end device 110 ensures that the transmission of the uplink frame 501 does not cause an instance of the individual reception window RW1 502, which is defined according to the instant of transmission of the uplink frame 501, to overlap an instance of the group reception window RW2 503. In other words, the end device 110 ensures that the transmission of the uplink frame 501 is such that any instance of the individual reception window RW1 502 is distinct from any instance of the group reception window RW2 503 defined for the group to which said end device 110 (or its client application in question) belongs.

It should be noted that the description is given for end devices that can receive downlink frames in individual reception windows, as is the case in Class A in the LoRaWAN data transmission protocol. The principle of the group reception windows can however apply to end devices that have the possibility of using supplementary reception windows defined in beacons transmitted by the gathering gateways 120, 121, 122, 123, as is the case in Class B in the LoRaWAN data transmission protocol, where a plurality of end devices can listen on the medium in the same time window. The principle of the group reception windows may however also apply to end devices that continuously listen on the communication medium, as is the case in Class C in the LoRaWAN data transmission protocol, since the gain in bandwidth remains valid.

Figure 5A:
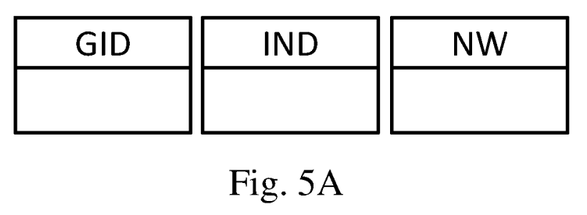
FIGS. 5A and 5B illustrate schematically message fields exchanged in the communication system in FIG. 1, in a particular embodiment of the invention.
Figure 5B:
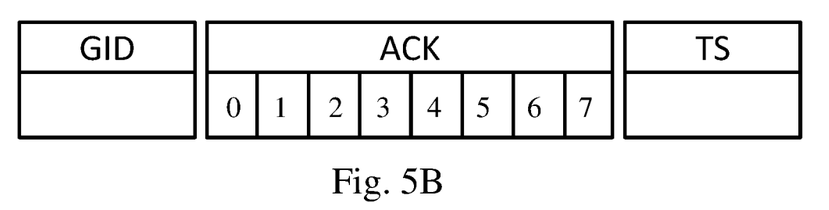

FIGS. 5A and 5B schematically illustrate message fields exchanged in the communication system in FIG. 1, in a particular embodiment of the invention.

FIG. 5A shows more particularly fields used in a message SUB-RQ by means of which the server 130 indicates to an end device that said end device has been associated with a group by the server 130. In other words, the message SUB-RQ is a message announcing subscription to said group.

In a particular embodiment, the same end device may be associated by the server 130 with a plurality of groups. In particular, the server 130 may associate various client applications of said end device with various respective groups. Thus a field GID (standing for Group Identifier) supplies a group identifier enabling the end device in question to know which group is associated with it by means of the message SUB-RQ. When there exists only one possible group in the communication system or when there is no ambiguity as to the designation of the group, this field GID may be omitted.

In addition, an indexing field IND indicates preferentially to said end device with which index (also referred to as a rank) said end device (or client application in question) is associated in said group.

The index in question may be attributed by the server 130 to the end device in question by taking an index from a set of available indices. For example, the server 130 attributes the indices in their increasing or decreasing order among said set of available indices. According to another example, the server 130 attributes the indices by random or pseudo-random drawing among said set of available indices. In a preferential variant, the index in question may be implicitly found by the end device and it is not then necessary to indicate it explicitly. To do this, the server 130 acts on the basis of the address attributed to the end device in question to communicate in the communication systems of FIG. 1. It is in fact usual to dynamically attribute addresses to the end devices of a communication system during an authentication phase where said end devices declare themselves to (a server of) the communication system. In the LoRaWAN protocol, this address is called DevAddr.

This address is typically, but not necessarily, represented in a larger number of bits than is required by the maximum capacity of the group. For example, this address attributed dynamically is in 32 bits, whereas the maximum capacity of the group is 256 end devices (which strictly requires only 8 representation bits).

We shall consider that the maximum capacity of the group is Ng, which requires only $Ng\_b > 0$ representation bits, and that the addresses attributed to the end devices in the communication system in FIG. 1 require strictly $Nd > Ng\_b$ representation bits. The law of large numbers means that the Ng_b least significant bits among the Nd bits of said addresses are sufficiently diversified among the end devices of the group in question to avoid conflicts of values. Each end device is then attributed the index in the group that corresponds to the Ng_b least significant bits among the Nd bits of the address that is attributed to it for communicating in the communication system of FIG. 1. This enables the server 130 and each end device to determine this index independently. It is thus possible to dispense with the aforementioned field IND. The server 130 may however all the same notify, in the field IND, the index thus obtained.

Returning to FIG. 5A, a time reference field NW (standing for Next Window) further supplies to said end device information representing the instant at which the next instance of the group reception window RW2 503 for said group starts. This information may be an absolute or relative time.

In the case where the communication system provides synchronism of the internal clocks of the various elements constituting said communication system, said information may represent an absolute time. It is however more in terms of implementation that said information represents a relative time (that is to say a length of time to be counted as from a deterministic moment).

In the case where the information is a relative time, the server 130, in calculating this relative time, takes account of the instant of occurrence of the instance of the individual reception window RW1 502 in which the message SUB-RQ is transmitted. Said information contained in the time reference field NW may be supplemented by supplementary information representing a duration of the period P separating the group reception window instances RW2 503 for said group, which may itself be supplemented by information on variability of the period P separating the group reception window instances RW2 503 for said group. The duration of the period P is for example made variable according to a predefined sequence of durations. It should be noted that this variability may be represented by random signed values around a nominal duration of the period P. The time reference field NW then indicates where the group is in said predefined sequence of durations (e.g. by means of an index in said sequence of durations), the predefined sequence of durations then being known in advance to the end devices (e.g. by configuration on installation) or given in the time reference field NW.

FIG. 5B depicts more particularly fields used in a group acknowledgement message MACK (Multicast ACKnowledgement), by means of which the server 130 makes a group acknowledgement for a set of end devices belonging to the same group The transmission of any group acknowledgement MACK is done in multicast mode in an instance of the group reception window RW2 503. The field GID already described identifies, as required, the group concerned.

In addition, a field ACK identifies which are the indices of the end devices for which the group acknowledgement MACK is intended among the end devices in said group. In FIG. 5B, eight subfields of index 0 to 7 are depicted purely illustratively (for example, the field ACK could contain 256 bits, thus making it possible to constitute groups of 256 end devices or client applications). Preferably, groups with a maximum capacity equal to Nb end devices, where Nb is a power of 2, are formed.

When a first predefined value (for example 1) is placed at the index associated with an end device, said group acknowledgement message MACK then includes an acknowledgement intended for the end device in question; and when a second predefined value (for example 0) is placed at the index associated with the end device in question, said group acknowledgement message MACK then does not include an acknowledgement intended for the end device in question.

In addition, a time synchronisation field TS (standing for Time Synchronization) is preferentially included in the group acknowledgement message MACK. The time synchronisation field TS supplies information indicating a relative time representing the instant at which the next instance of the group reception window occurs. This time synchronisation field TS has the same function as the time reference field NW, but the time synchronisation field TS is relative, where the time reference field NW could be absolute.

In the case where the period P separating the group reception window instances is variable, the field TS then indicates also where the group is in the predefined sequence of aforementioned durations.

Figure 6:
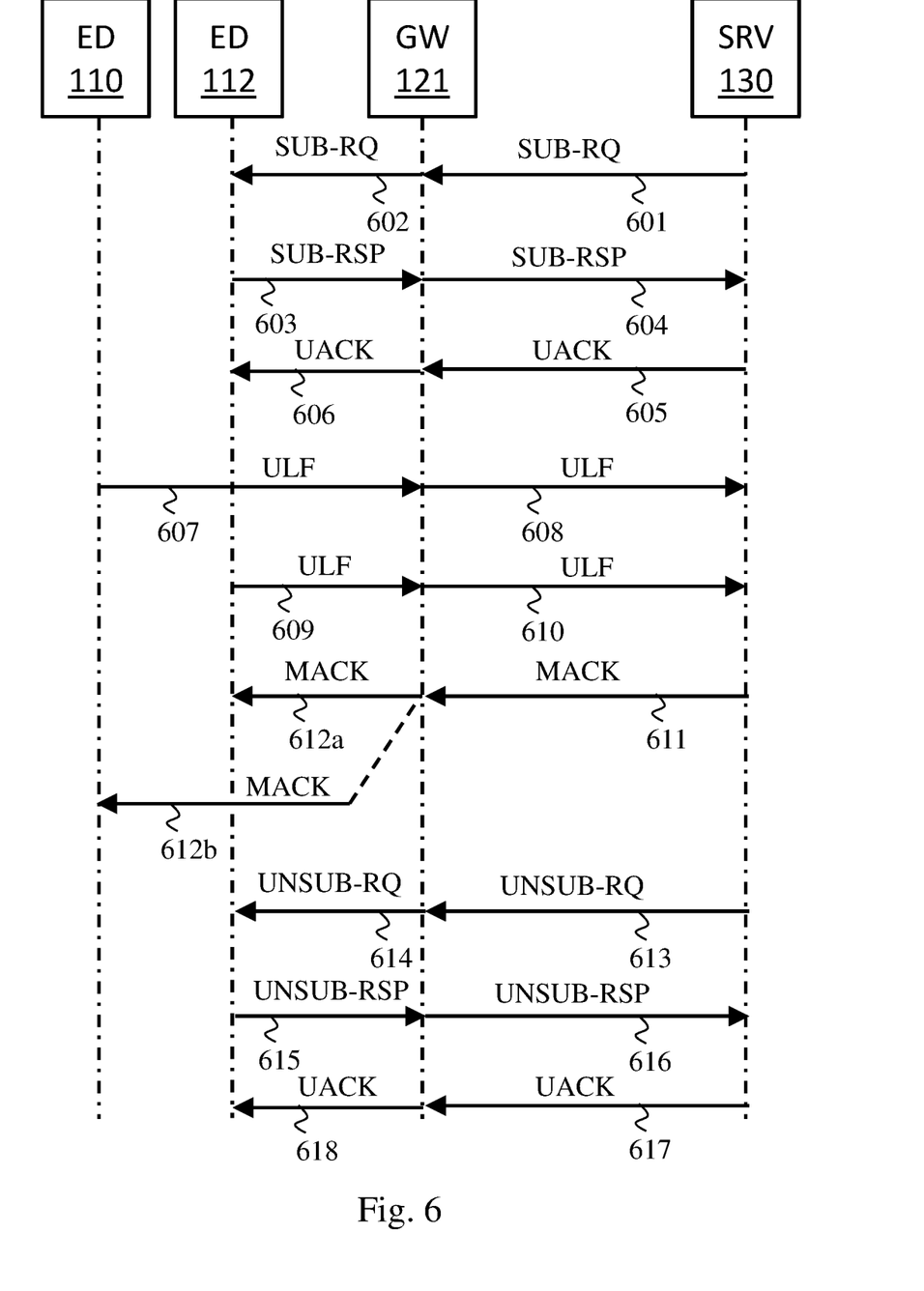
FIG. 6 illustrates schematically message exchanges in the communication system in FIG. 1, in a particular embodiment of the invention.

FIG. 6 illustrates schematically message exchanges in the communication system in FIG. 1, in a particular embodiment of the invention. It is considered in FIG. 6 that the end device 110 (or a client application of the end device 110) is allocated to a group and that the server 130 decides also to allocate the end device 112 (or a client application of the end device 112) to this same group.

When there exists a plurality of possible groups in the communication system, the server 130 allocates the end devices to such and such a group according to the client applications of said end devices. According to another criterion, the server 130 allocates the end devices to such and such a group according to the gathering gateways that connect the uplink frames of said end devices, or which statistically most often relay the uplink frames of said end devices. According to yet another criterion, the server 130 allocates the end devices to such and such a group according to the geographical location of said end devices. Combinations of criteria including at least one among those above may be implemented.

When a first group has reached a maximum number of end devices authorised in said first group (in particular because the message MACK has a maximum capacity of simultaneous acknowledgements), at least one second group is created in order subsequently to include therein other end devices that meet the criteria for inclusion in the first group. It is then possible, as required, to balance the groups thus created, by disassociating one or more end devices from a group in order then to associate them with another group. In a variant, when a group has reached the maximum number of end devices authorised in said group, it is possible to replace one or more end devices in said group with other end devices.

In a step 601, the server 130 transmits a downlink frame including a message SUB-RQ to the end device 112 via the gathering gateway 121. The server 130 transmits said message SUB-RQ in response to an uplink frame (not shown in FIG. 6) transmitted by the end device 112, so that the gathering gateway 121 can transmit said message SUB-RQ, as well as an individual acknowledgement (in unicast mode) of said uplink frame, in an instance of the individual reception window RW1 502 that is defined according to the instant of transmission of said uplink frame. Apart from the header fields making it possible to provide the communications according to the protocol architecture described in relation to FIG. 3, the message SUB-RQ includes fields, as described in relation to FIG. 5A, for informing the end device 112 that the server 130 associates the end device 112 with the group in question.

Preferentially, the server 130 transmits the frame that includes the message SUB-RQ in response to an uplink frame transmitted by the client application communicating with a server application with which the group in question is associated. Thus the end device 112 knows to which client application (if there is any ambiguity) the group in question corresponds.

In a step 602, the gathering gateway 121 transmits the message SUB-RQ to the end device 112 in said instance of the individual reception window RW1 502. The announcement of subscription to the group in question is thus made in unicast mode.

In a step 603, the end device 112 transmits an uplink frame including a message SUB-RSP by means of which the end device 112 confirms reception of the message SUB-RQ. By means of the message SUB-RSP, the end device 112 has the possibility of accepting or refusing the subscription. For example, the end device 112 may now belong to one or more groups and have reached a maximum limit (e.g. 4) of authorised simultaneous groups. According to another example, accepting subscription to a group gives rise, for the end device 112, to an expenditure of energy that is just a little greater, since the end device 112 will have to come out of standby more frequently in order to listen on the communication medium. The end device 112 may for example refuse to subscribe to a group when the level of energy reserves of the end device 112 is below a predefined threshold. We shall consider here that the end device accepts the subscription proposed by the server 130.

In a step 604, the gathering gateway 121 has captured the uplink frame transmitted at step 603 by the end device 112 and therefore effects a relaying of the message SUB-RSP to the server 130, which is then informed that the end device 112 has accepted the subscription to the group in question. The uplink frame transmitted at step 603 may have been relayed to the server 130 by a plurality of gateways within radio range of the end device 112, and it is then the responsibility of the server 130 to ensure deduplication of frames.

In a step 605, the server 130, by means of a message UACK (Unicast ACK), acknowledges the uplink frame transmitted by the end device 112 at step 603. This individual acknowledgement is relayed to the end device 112 by the gathering gateway 121 in a step 606. The transmission of this individual acknowledgement is therefore done in unicast mode, that is to say in an instance of the individual reception window RW1 502 that is defined according to an instant of transmission of the uplink frame of step 603.

Subsequently, in a step 607, the end device 110 transmits an uplink frame ULF (standing for UpLink Frame) to the server 130. This uplink frame ULF is captured by the gathering gateway 121, which relays it, in a step 608, to the server 130. Here again, this uplink frame ULF may have been relayed to the server 130 by a plurality of gateways within radio range of the end device 112, and it is then for the server 130 to ensure deduplication of frames.

And in a step 609 the end device 112 transmits another uplink frame ULF to the server 130. This uplink frame ULF is captured by the gathering gateway 121 (and/or by another gathering gateway), which relays it, in a step 610, to the server 130.

We shall consider that these two uplink frames ULF have been transmitted for the same period P that separates two group reception window instances RW2 503 for the group associated with the end devices 110 and 112 (or with their respective client applications in question).

In a step 611, the server 130 transmits a group acknowledgement MACK for the uplink frames ULF transmitted in steps 607 and 609. In the field ACK, the values associated with the indices of the end devices 110 and 112 indicate that the server 130 acknowledges the uplink transmissions ULF of steps 607 and 609. This group acknowledgement MACK is, in a step 612, relayed by the gathering gateway 121 in the instance of the group reception window RW2 503 that follows the period P during which the uplink frames ULF were transmitted at steps 607 and 609. In FIG. 6, step 612 is broken down into two substeps 612A and 612B in order to show that the transmission of the group acknowledgement MACK is done in multicast mode. While the end devices 110 and 112 are listening on the communication medium in the instance of the group reception window RW2 503 that concerns them, the end devices 110 and 112 receive the group acknowledgement MACK relayed by the gathering gateway 121. The end devices 110 and 112 then analyse the group acknowledgement MACK in order to determine whether their own index (or rank) in the field ACK indicates that the uplink frames ULF that they previously transmitted at steps 607 and 609 are acknowledged by the server 130. If not, the uplink frame ULF not acknowledged must subsequently be retransmitted by the end device concerned.

For the gathering gateway 121 to know at what moment to transmit the group acknowledgement MACK, the server 130 indicates, in a header encapsulating the group acknowledgement MACK, information representing the instant at which the gathering gateway 121 is supposed to relay the group acknowledgement MACK to the end devices. The gathering gateway 121 may moreover at this moment transmit a plurality of successive copies (e.g. 3 copies) of the group acknowledgement MACK in order to increase the chances of reception on the part of the end devices concerned.

It should be noted that, with regard to the downlink frames to be transmitted in the individual reception window instances RW1 502, the gathering gateway 121 keeps track of the instant of reception of the uplink frame concerned and the server 130 indicates, in a header encapsulating said downlink frame, a relative time after which the gathering gateway 121 is supposed to relay the downlink frame. The gathering gateway 121 then relays said downlink frame after expiry of said relative time to be counted from the instant of reception of the uplink frame concerned. In a variant, the gathering gateway 121 may by itself determine at what moment to start each instance of the individual reception window RW1 502 according to the instant of reception of the uplink frame concerned, having prior knowledge of the predefined relative time that is to separate said instance of the individual reception window RW1 from the instant of reception of the uplink frame concerned.

In order to disassociate an end device from a group, a procedure similar to that used for associating the end device with the group is established. For example, the server 130 may wish to disassociate said end device from a group in order to replace it therein with another end device, the presence of which in said group is more suitable, for example because said other end device transmits more frequently or because said other end device is geographically located closer to the other end devices in said group.

Let us consider the case of a disassociation of the end device 112. Thus, in a step 613, the server 130 transmits a downlink frame including a message UNSUB-RQ to the end device 112 via the gathering gateway 121. The server 130 transmits said message UNSUB-RQ in response to an uplink frame transmitted by the end device 112 so that the gathering gateway 121 can transmit said message UNSUB-RQ, as well as an individual acknowledgement (in unicast mode) of said uplink frame, in an instance of the individual reception window RW1 502 that is defined according to an instant of transmission of said uplink frame. Apart from the header fields making it possible to provide communications according to the protocol architecture described in relation to FIG. 3, the message UNSUB-RQ includes the field GID for identifying, as required, the group in question.

In a step 614, the gathering gateway 121 transmits the message UNSUB-RQ to the end device 112 in said instance of the individual reception window RW1 502. The announcement of disassociation to the group in question is thus done in unicast mode.

In a step 615, the end device 112 transmits an uplink frame including a message UNSUB-RSP by means of which the end device 112 confirms reception of the message UNSUB-RQ. By means of the message UNSUB-RSP, the end device 112 confirms that it has taken account of the unsubscription of the group, which signifies that the acknowledgements of the uplink frames sent by the end device 112 (or by the client application concerned) next take place in instances of individual reception windows RW1 502.

In a step 616, the gathering gateway 121 captured the uplink frame transmitted at step 615 by the end device 112 and therefore relays the message UNSUB-RSP to the server 130, which is then informed that the end device 112 has confirmed that it has taken into account the unsubscription of the group. Here also, the uplink frame in question may have been relayed to the server 130 by a plurality of gateways within radio range of the end device 112, and it is then the responsibility of the server 130 to ensure deduplication of frames.

In a step 617, the server 130, by means of a message UACK, acknowledges the uplink frame transmitted by the end device 112 at step 615. This individual acknowledgement UACK is relayed to the end device 112 by the gathering gateway 121 in a step 618. The transmission of this individual acknowledgement UACK is therefore done in unicast mode, that is to say in an instance of the individual reception window RW1 502 that is defined according to an instant of transmission of the uplink frame at step 615.

Figure 7:
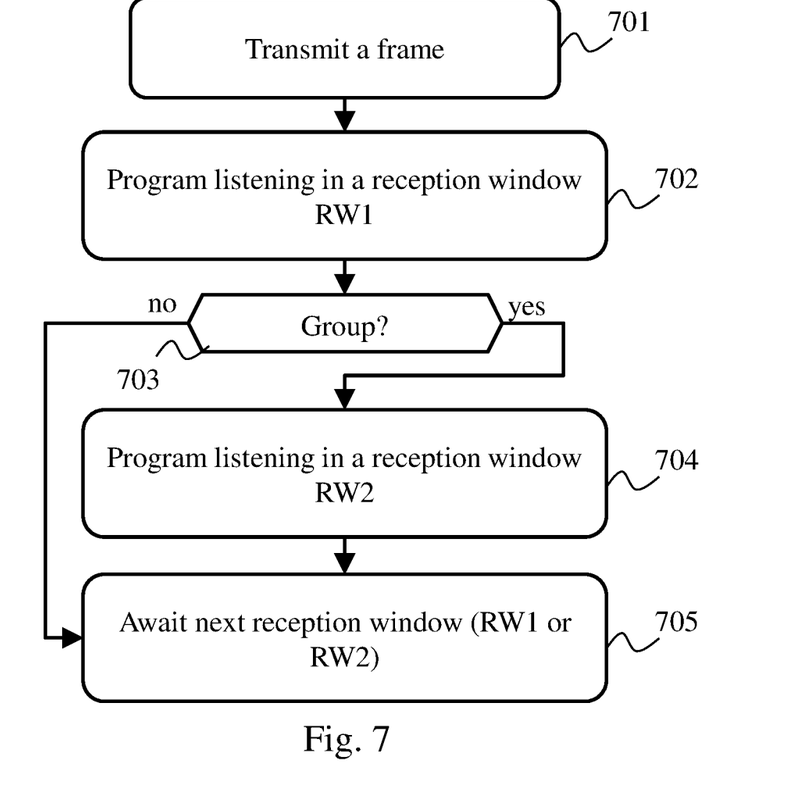
FIG. 7 illustrates schematically a first reception window programming algorithm, in a particular embodiment of the invention.

FIG. 7 illustrates schematically a first reception window programming algorithm, in a particular embodiment of the invention. The algorithm in FIG. 7 is implemented by the end devices 110, 111, 112. Let us consider by way of illustration that the algorithm in FIG. 7 is implemented by the end device 110.

In a step 701, the end device 110 transmits an uplink frame, with a view to reception by at least one gathering gateway responsible for relaying it to the server 130.

In a step 702, the end device 110 programs accordingly a listening on the communication medium in at least one instance of an individual reception window RW1 502.

In a step 703, the end device 110 checks whether said end device 110 belongs to a group (or whether the client application of the end device 110 involved in the sending of said uplink frame belongs to a group). If such is the case, a step 704 is performed; otherwise a step 705 is performed.

In step 704, the end device 110 programs accordingly a listening on the communication medium in the next instance of the group reception window RW2 503 associated with said group. It is stated here that, when the end device 110 receives the message SUB-RQ, the end device 110 receives from the server 130 in the time reference field NW information representing the instant at which a next instance of the group reception window RW2 503 will start. In addition, it is stated here that the end device 110 has knowledge of the durations of the periods P that separate the instances of group reception windows RW2 for the group to which said end device 110 (or the client application concerned) belongs. Thus the end device 110 has knowledge of the instants to which each said instance of the group reception window RW2 503 in question is supposed to occur. Then step 705 is performed.

In step 705, the end device 110 awaits the next programmed reception window instance. The end device 110 can await the time that the next programmed reception window instance occurs.

Figure 8:
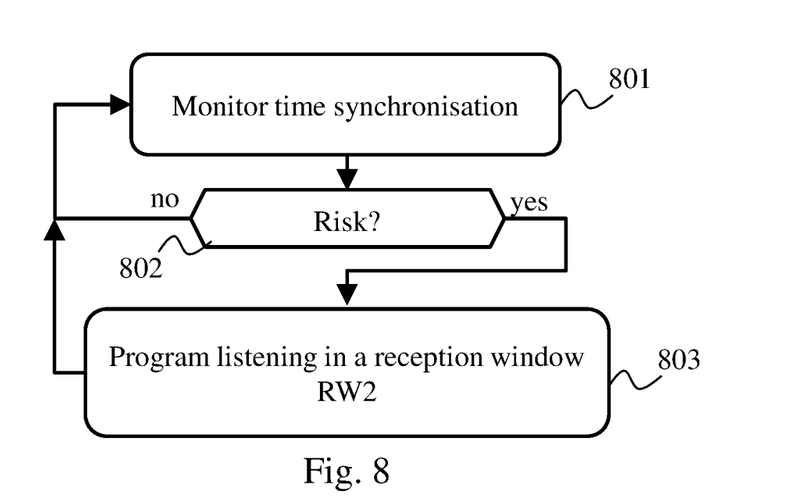
FIG. 8 illustrates schematically a second reception window programming algorithm, in a particular embodiment of the invention.

FIG. 8 illustrates schematically a second reception window programming algorithm, in a particular embodiment of the invention. Let us consider by way of illustration that the algorithm in FIG. 8 is implemented by the end device 110.

Apart from the possibility of receiving group acknowledgements MACK, the end device 110 can use the instances of the group reception window RW2 503 to synchronise itself timewise in the communication system. This is because, since the end device 110 has the possibility of going on standby, its internal clock may drift over time and regular time resynchronisation is then necessary. The end device 110 can then rely on the actual instant of reception of the MACK messages in order to carry out such time synchronisation. Thus, when the end device 110 has transmitted an uplink frame, the end device 110 can profit from the learning of the instant of reception of the downlink frame transmitted in the instance of the following group reception window RW2 503 in order to carry out the time resynchronisation at the same time as checking that the server 130 actually acknowledges the uplink frame in question. It is also possible that said end device 110 does not have to transmit an uplink frame during a certain time, so that its internal clock may drift excessively before the occurrence of the instance of the group reception window RW2 503 that follows its next uplink frame transmission. Then, in a particular embodiment, the end device 110 will seek to listen out on the communication medium in an instance of the group reception window RW2 independently of its transmissions of uplink frames, in order to remain synchronised timewise in the communication system.

Thus, in a step 801, the end device 110 monitors the time synchronisation of its internal clock. In other words, the end device 110 monitors the theoretical maximum drift of its internal clock since the last time synchronisation carried out by the end device 110, for example since the last time that the end device 110 resynchronised its internal clock by means of the learning of the instant of transmission of a group acknowledgement MACK. For example, the theoretical maximum drift of the internal clock of the end device 110 is around 10 ppm, that is to say less than one second per day plus or minus.

In a step 802, the end device 110 determines whether there is a risk that its internal clock may have drifted excessively with respect to the rest of the communication system and in particular the server 130 and/or with respect to a predefined threshold. For example, the end device 110 is programmed so as to come out of standby 100 milliseconds before the theoretical start of any reception window. The end device 110 can then seek to resynchronise itself timewise every 2 hours. If there is a risk that the internal clock has drifted excessively with respect to the rest of the communication system and in particular the server 130 and/or with respect to a predefined threshold, a step 803 is performed; otherwise step 801 is reiterated.

In step 803, the end device 110 programs accordingly a listening on the communication medium in the next group reception window RW2 503, as already described in relation to FIG. 7. It will then determine the actual instant of transmission (or reception) of the group acknowledgement MACK, although this does not concern it. This enables it to know the offset between the actual instant of transmission (or reception) of the group acknowledgment MACK and the instant at which said end device 110 had previously estimated that the instant of transmission (or reception) of the group acknowledgement MACK was to occur from its point of view (because of its internal clock). The determination of this offset therefore enables it to adjust its internal clock in order to remain synchronised. Then step 801 is reiterated.

The invention claimed is:

1. A method for transmitting acknowledgements in a communication system comprising a server, a plurality of end devices, and at least one gathering gateway serving as a relay between the server and the end devices, each end device communicating with said at least one gathering gateway via a wireless communication medium, the method being implemented by the server, wherein the method comprises:
   creating at least one group and allocating end devices of the plurality of end devices to each group created;
   defining, for each group created, instances of a group reception window during which the end devices of the respective group can listen out on the wireless communication medium in order to determine whether their uplink frame is acknowledged in a group acknowledgement, the instances of a group reception window being separated by a period P of predetermined duration known to the server and to each end device of the respective group, so that the instances of said group reception window occur at deterministic instants;
   receiving uplink frames from the end devices of the plurality of end devices;
   for a first end device allocated to a group of the at least one group, acknowledging the uplink frames received in a downlink frame transmitted in multicast mode in a first instance of the instances of the group reception window defined for said group, said downlink frame including a group acknowledgement for all uplink frames (ULF) sent by the end devices in said group during the period P preceding said first instance of the instances of a group reception window; and
   for a second end device that is not allocated to any group of the at least one group, acknowledging uplink frames received in unicast mode.

2. The method according to claim 1, wherein allocating said first end device to the group, the server transmits to said first end device a subscription message by means of which the server indicates to said first end device that said first end device has been associated with said group, the subscription message including index information (IND) indicating with which index said first end device is associated in said group, the index associating with said first end device a bit position in a field (ACK) of the group acknowledgement for all ULF.

3. The method according to claim 1, wherein the server transmits to said first end device a subscription message by means of which the server indicates to said first end device that said first end device has been associated with said group, and in that an index is implicitly associated with said first end device in said group, the index associating with said first end device a bit position in a field (ACK) of the group acknowledgement for all ULF, the index having a value equal to the value of $Ng\_b>0$ least significant bits among Nd bits used for representing an address attributed to said first end device for communicating in the communication system.

4. The method according to claim 2, wherein the subscription message includes a time reference field (NW) representing an instant at which, for said group, a next instance of the group reception window starts.

5. The method according to claim 4, wherein the time reference field (NW) further includes supplementary information representing a duration of the period P separating the instances of the group reception window for said group.

6. The method according to claim 5, wherein the time reference field (NW) further includes information on variability of the period P separating the instances of the group reception window for said group.

7. The method according to claim 6, wherein the duration of the period P is variable according to a predefined sequence of durations, and the time reference field (NW) includes information indicating where the group is in said predefined sequence of durations, the predefined sequence of durations then being known in advance to the plurality of end devices or included in the subscription message.

8. The method according to claim 1, wherein the group acknowledgement for all ULF includes a time synchronisation field (TS) supplying a relative time corresponding to an instant at which a next instance of the group reception window occurs for said group.

9. A method for receiving acknowledgements in a communication system comprising a server, a plurality of end devices, and at least one gathering gateway serving as a relay between the server and the end devices, each end device communicating with said at least one gathering gateway via a wireless communication medium, the method being implemented by each end device, wherein the method comprises:
transmitting uplink frames to the server;
receiving from the server a message allocating said end device to a group, wherein the end device is allocated to the group;
in response to said end device receiving from the server the message allocating the end device to the group, programming a listening on the wireless communication medium during instances of a group reception window during which end devices in the group can listen out on the wireless communication medium in order to determine whether their uplink frame is acknowledged in a group acknowledgement, the instances of a group reception window being separated by a period P of predetermined duration known to the server and to each end device of said group, so that the instances of the group reception window occur at deterministic instants; and
receiving in multicast mode downlink frames including acknowledgements of said uplink frames during the instances of the group reception window, each downlink frame including a group acknowledgement for all uplink frames sent by the end devices in the group during a period P preceding a first instance of said instances of the group reception window.

10. The method according to claim 9, wherein the method further comprises:
receiving from the server a subscription message by means of which the server indicates to said end device that said end device has been associated with said group, the subscription message including index information indicating with which index said end device is associated in said group, the index associating with said end device a bit position in a field (ACK) of the group acknowledgements of the downlink frames; and
on reception of a group acknowledgement, determining whether a first uplink frame previously transmitted by said end device is acknowledged, by checking the value at said bit position in the field (ACK) of the group acknowledgements.

11. The method according to claim 9, wherein the method further comprises:
receiving from the server a subscription message by means of which the server indicates to said end device that said end device has been associated with said group,
in that an index is implicitly associated with said end device in said group, the index associating with said end device a bit position in a field (ACK) of the group acknowledgements of the downlink frames, the index having a value equal to the value of $Ng\_b>0$ least significant bits among Nd bits used for representing an address attributed to said end device for communicating in the communication system,
and in that the method further comprises the following step:
on reception of a group acknowledgement, determining whether a first uplink frame previously transmitted by said end device is acknowledged, checking the value at said bit position in the field (ACK) of the group acknowledgements.

12. The method according to claim 10, wherein the subscription message includes a time reference field (NW) representing an instant at which, for said group, a next instance of the group reception window starts, and said end device programs a listening on the wireless communication medium according to the time reference field.

13. The method according to claim 12, wherein the time reference field (NW) further includes supplementary information representing a duration of the period P separating the instances of the group reception window for said group.

14. The method according to claim 13, wherein the time reference field (NW) further includes information on variability of the period P separating the instances of the group reception window for said group.

15. The method according to claim 14, wherein the duration of the period P is variable according to a predefined sequence of durations, the time reference field further indicates where the group is in said predefined sequence of durations, the predefined sequence of durations then being known in advance to the end device or included in the subscription message.

16. The method according to claim 9, wherein the group acknowledgement for all uplink frames ("ULF") includes a time synchronisation field (TS) supplying a relative time corresponding to an instant at which a next instance of the group reception window occurs for said group, and the method further comprises:
- when said end device detects whether an internal clock of said end device is not aligned with the server greater than a predetermined amount, programming a listening on the wireless communication medium during a group reception window instance for said group, independently of any uplink transmission by said end device; and
- resynchronising the internal clock of said end device by means of a determination of an offset between an actual transmission or reception instant of a first group acknowledgement received during the group reception window instance and a previously estimated instant of transmission or reception of said first group acknowledgement.

17. A non-transitory information storage medium storing a computer program comprising a set of instructions causing execution, by a processor, of the method according to claim 1, when said computer program is executed by said processor.

18. A server intended to be included in a communication system comprising a plurality of end devices and at least one gathering gateway serving as a relay between the server and the end devices, each end device communicating with said at least one gathering gateway via a wireless communication medium, wherein the server comprises:
  circuitry configured to:
    create at least one group and allocate end devices of the plurality of end devices to each group created;
    define, for each group created, instances of a group reception window during which the end devices of the respective group can listen out on the wireless communication medium in order to determine whether their uplink frame is acknowledged in a group acknowledgement, the instances of a group reception window being separated by a period P of predetermined duration known to the server and to each end device of the respective group, so that the instances of the group reception window occur at deterministic instants;
    receive first uplink frames from the end devices of the plurality of end devices;
    for a first end device allocated to a first group of the at least one group, acknowledge the first uplink frames received in a downlink frame transmitted in multicast mode in an instance of the instances of the group reception window defined for said first group, said downlink frame including a group acknowledgement for all uplink frames (ULF) sent by the end devices in said first group during the period P preceding said instance of the instances of the group reception window; and,
    for a second end device that is not allocated to any group of the at least one group, acknowledge uplink frames received in unicast mode.

19. A first end device intended to be included in a communication system comprising a server and at least one gathering gateway serving as a relay between the server and the first end device, the first end device communicating with said at least one gathering gateway via a wireless communication medium, wherein the first end device comprises:
  circuitry configured to:
    transmit uplink frames to the server;
    when the first end device has received from the server a message allocating the first end device to a group, program a listening on the wireless communication medium during instances of a group reception window during which the first end device of said group can listen out on the wireless communication medium in order to determine whether their uplink frame is acknowledged in a group acknowledgement, the instances of the group reception window being separated by a period P of predetermined duration known to the server and to each end device of said group, so that the instances of the group reception window occur at deterministic instants;
    when the first end device is allocated to the group, receive in multicast mode downlink frames including acknowledgements of said uplink frames during the instances of the group reception window, each downlink frame including a group acknowledgement for all uplink frames sent by end devices in the group during a period P preceding a first instance of said instances of the group reception window; and
    when the first end device is not allocated to any group, receive in unicast mode downlink frames including acknowledgements of said uplink frames.

20. A communication system comprising the server in accordance with claim 18, a series of end devices, and a gateway serving as a relay between the server and the series of end devices.

* * * * *